United States Patent Office 3,346,572
Patented Oct. 10, 1967

3,346,572
PYRAZOLO[4,3-c][1,2]BENZOTHIAZINE 5,5-DIOXIDES AND PROCESS FOR THEIR PRODUCTION
John Shavel, Jr., Mendham, and Harold Zinnes, Rockaway, N.J., assignors to Warner-Lambert Pharmaceutical Company, Morris Plains, N.J., a corporation of Delaware
No Drawing. Filed Aug. 17, 1966, Ser. No. 572,877
10 Claims. (Cl. 260—243)

ABSTRACT OF THE DISCLOSURE

A new class of substituted 1,2-benzothiazines of the formula:

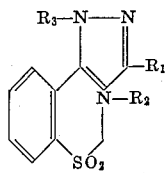

which are useful as central nervous system depressants.

---

This is a continuation-in-part of application Ser. No. 414,456, filed Nov. 27, 1964, now abandoned.

This invention relates to substituted 1,2-benzothiazines and more particularly, this invention relates to pyrazolo [4,3-c] [1,2]benzothiazine 5,5-dioxides having the following structural formula:

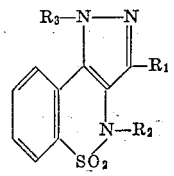

wherein $R_1$ represents lower alkyl such as methyl, ethyl, isobutyl and aryl such as phenyl; $R_2$ represents hydrogen; lower aralkyl such as benzyl; alkyl such as methyl, ethyl and isobutyl; cyanomethyl, carboxymethyl; carboalkoxymethyl such as —$CH_2CO_2CH_3$, —$CH_2CO_2C_2H_5$; acylmethyl such as —$CH_2COCH_3$; aroylmethyl such as —$CH_2COC_6H_5$; 2-hydroxyalkyl such as

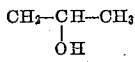

and dialkylaminoalkyl such as —$CH_2CH_2N(C_2H_5)_2$; and $R_3$ represents hydrogen, lower alkyl such as methyl, ethyl, isobutyl and aryl such as phenyl.

The invention also includes within its scope a novel process for the production of the above compounds.

The compounds of this invention are useful as central nervous system depressants in mammals such as mice. In order to use the compounds of this invention they are combined with an inert pharmaceutical diluent to form dosage forms such as tablets or solutions. Generally, a dose of about 1 to 100 mg. orally may be used to produce the desired depressant effects. They also exhibit significant analgesic activity and, in addition, they are useful as intermediates for the production of other substituted 1,2-benzothiazines.

According to the process of this invention, the compounds of this invention are prepared by refluxing a compound of the formula:

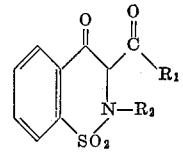

wherein $R_1$ and $R_2$ are as defined above with a hydrazine derivative of formula $$R_3NHNH_2 \qquad III$$

in which $R_3$ is as defined in a solvent system such as, for example, ethanol. The starting material is described and claimed in copending application Ser. No. 418,552, entitled, "3-Acyl-2H-1,2-Benzothiazin-4-(3H)-One 1,1-Dioxides," filed on Dec. 15, 1964. In the case where $R_3$ is aryl, the reaction yields a phenylhydrazone corresponding to the formula:

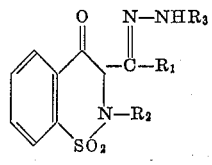

and the compound obtained can be isolated in the crystalline state. In order to effect the final cyclization to give the desired compounds of this invention in which $R_3$ is aryl, compound IV is refluxed with an acid, for example, dilute hydrochloric acid. The latter cyclization step can be carried out with the crystalline hydrazone IV or in situ without actually isolating the latter.

An alternate method enabling one to prepare these compounds wherein $R_2$ is a substituent other than hydrogen is by an appropriate alkylation procedure wherein compounds of Formula I in which $R_2$ is hydrogen are reacted with compounds of formula $R_2X$ in which $R_2$ is as defined above and X is halogen. These alkylation reactions are carried out in aqueous alcoholic solutions in the presence of an alkali metal hydroxide. Nonaqueous solvents may also be employed for this reaction and these solvents include, for example, dimethylformamide or 1,2-dimethoxyethane. The $R_2$ group can be further transformed chemically. For example, the acylmethyl group

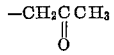

can be reduced with a suitable reducing agent such as sodium borohydride to give the corresponding alcohol in which $R_2$ is

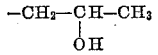

The following examples are included in order further to illustrate the invention. All ultraviolet spectra are recorded as a solution in 95% ethanol whereas the infrared spectra are recorded as Nujol mulls.

EXAMPLE 1

*1,4-dihydro-3,4-dimethylpyrazolo[4,3-c] [1,2]benzothiazine 5,5-dioxide*

A solution of 12.5 g. (0.05 mole) of 3-acetyl-2-methyl-2H-1,2-benzothiazin-4(3H)-one 1,1-dioxide and 10 g. of hydrazine hydrate in 50 ml. of ethanol is refluxed for four hours. Refrigeration of the reaction mixture gives 10.3 g. of 1,4-dihydro-3,4-dimethylpyrazolo[4,3-c] [1,2] benzothiazine 5,5-dioxide as white crystals, M.P. 231–233° C. Recrystallization from ethanol gives material, M.P. 232–234° C.; γ max. 3380, 1604 cm.$^{-1}$; λ max. mµ (ε) 258 (10,200), 295 sh. (4,000), λ min. 232 (4,000).

*Analysis.*—For $C_{11}H_{11}N_3O_2S$—Calc'd: C, 53.00; H, 4.45; N, 16.86. Found: C, 53.06; H, 4.65; N, 16.88.

EXAMPLE 2

*1,4-dihydro-3-methylpyrazolo[4,3-c] [1,2]benzothiazine 5,5-dioxide*

A solution of 24 g. (0.1 mole) of 3-acetyl-2H-1,2-benzothiazin-4(3H)-one 1,1-dioxide and 20 g. of hydrazine hydrate in 200 ml. of ethanol is refluxed for five hours. The reaction mixture is treated with 200 ml. of 1 N hydrochloric acid and is refrigerated at 0° to 10° C. The resulting white crystals are collected, washed with 50% aqueous ethanol, sucked dry, and recryscrallized from acetonitrile to give 10.5 g. of 1,4-dihydro-3-methyl-pyrazolo[4,3-c] [1,2]benzothiazine 5,5-dioxide, M.P. 243–245° C.; γ max. 3350, 3060, 1618 cm.$^{-1}$; λ max. mμ (ε) 258 (12,200), 295 sh. (5,000); λ min. 231 (4,000).

*Analysis.*—For $C_{10}H_9N_3O_2S$—Calc'd: C, 51.05; H, 3.86; N, 13.63. Found: C, 51.24; H, 3.83; N, 17.61.

The filtrate from the original reaction mixture is distilled in vacuo to remove the ethanol and 400 ml. of 0.5 N hydrochloric acid is added. The resulting precipitate is washed with water, sucked dry, and recrystallized from acetonitrile to give 3.2 g. of a second crop, M.P. 240–243° C.

EXAMPLE 3

*1,4-dihydro-4-methyl-3-phenylpyrazolo[4,3-c] [1,2] benzothiazine 5,5-dioxide*

A solution of 15.8 g. (0.05 mole) of 3-benzoyl-2-methyl-2H-1,2-benzothiazin-4(3H)-one 1,1-dioxide and 10.0 g. (0.2 mole) of hydrazine hydrate in 125 ml. of ethanol is refluxed for four hours, during which time white crystals begin to separate out. The reaction mixture is allowed to cool to room temperature to obtain 13.3 g. of 1,4-dihydro-4-methyl-3-phenylpyrazolo[4,3-c] [1,2] benzothiazine 5,5-dioxide, M.P. 249–250° C. The M.P. is unchanged after recrystallization from dichloromethane-ethanol; γ max. 3350, 1594 cm.$^{-1}$; λ max. mμ (ε) 258 mμ (26,500), 300 sh. (7,000); λ min. 230 (13,500).

*Analysis.*—For $C_{16}H_{13}N_3O_2S$—Calc'd: C, 61.71; H, 4.21; N, 13.50; S, 10.29. Found: C, 61.43; H, 4.16; N, 13.41; S, 10.35.

EXAMPLE 4

*1,4-dihydro-3-methyl-1-phenylpyrazolo[4,3-c] [1,2] benzothiazine 5,5-dioxide*

A solution of 48 g. (0.2 mole) of 3-acetyl-2H-1,2-benzothiazin-4(3H)-one and 45.2 g. (0.4 mole) of phenylhydrazine in 600 ml. of ethanol is refluxed for three hours. It is cooled to 50° C. and 200 ml. of 9% hydrochloric acid is added. The mixture is refluxed with stirring for one hour and is allowed to stand at room temperature for 18 hours. The resulting crystals are collected, washed with 50 ml. of ethanol-water (2:1), sucked dry, and recrystallized from ethanol to give 33 g. of 1,4-dihydro - 3 - methyl-1-phenylpyrazolo[4,3-c] [1,2]benzothiazine 5,5-dioxide, M.P. 224–255° C.; γ max. 2720, 1599 cm.$^{-1}$; λ max. mμ (ε) 274 (14,800), 300 sh. (10,000), λ min. 241 (6,000).

*Analysis.*—For $C_{16}H_{13}N_3O_2S$—Calc'd: C, 61.72; H, 4.21; N, 13.50. Found: C, 61.61; H, 4.03; N, 13.62.

EXAMPLE 5

*3-acetyl-4-hydroxy-2-methyl-2H-1,2-benzothiazine 1,1-dioxide phenylhydrazone*

A solution of 12.5 g. (0.5 mole) of 3-acetyl-2-methyl-2H-1,2-benzothiazin-4(3H)-one 1,1-dioxide and 20 g. of phenylhydrazine in 100 ml. of ethanol is refluxed for five hours and then allowed to stand at room temperature for 18 hours. The resulting yellow crystals are collected and recrystallized from ethanol to give 12.1 g. of 3-acetyl-4-hydroxy-2-methyl-2H-1,2 - benzothiazine 1,1-dioxide phenylhydrazone, M.P. 175–176° C.; γ max. 3350, 2700–2400 (broad), 1608, 1572, 1528 cm.$^{-1}$; λ max. mμ (ε) 239 (12,000), 387 (13,500), λ min. 226 (11,000), 316 (4,000).

*Analysis.*—For $C_{17}H_{17}N_3O_3S$—Calc'd: C, 59.46; H, 4.99; N, 12.24; S, 9.34. Found: C, 59.71; H, 5.19; N, 12.30; S, 9.38.

EXAMPLE 6

*1,4-dihydro-3,4-dimethyl-1-phenylpyrazolo[4,3-c] [1,2]benzothiazine 5,5-dioxide*

(A) *Preparation from the corresponding 4-unsubstituted analog.*—A solution of 15.5 g. (0.05 mole) of 1,4-dihydro-3-methyl-1 - phenylpyrazolo[4,3 - c] [1,2]benzothiazine 5,5-dioxide in a mixture of 100 ml. of 0.5 N sodium hydroxide and 200 ml. of ethanol was treated with 15 ml. of methyl iodide and was allowed to stand at room temperature for 18 hours. The resulting crystals are collected and recrystallized from ethanol to give 12.3 g. of product, M.P. 177–178° C. (resolidified partially and remelted at 184–186° C.). Recrystallization gives M.P. 178–179° C. resolidifies partially and melts completely at 184–186° C.; γ max. 1602 cm.$^{-1}$; λ max. mμ (ε) 274 (14,750), 297 sh. (10,500), λ min. 242 (5,500).

*Analysis.*—For $C_{17}H_{15}N_3O_2S$—Calc'd: C, 62.75; H, 4.56; N, 12.91. Found: C, 62.83; H, 4.66; N, 12.78.

(B) *Preparation from the corresponding hydrazone.*—To a solution of 12 g. of 3-acetyl-4-hydroxy-2-methyl-2H,-1,2-benzothiazine 1,1-dioxide phenyl hydrazone in 200 ml. of refluxing ethanol is added 10 ml. of concentrated hydrochloric acid. Refluxing is continued for thirty minutes during which time the bright orange solution becomes pale yellow in color. To the refluxing solution is added 200 ml. of water and the reaction mixture is allowed to cool to room temperature. The resulting white crystals are collected and recrystallized from ethanol to give 7.5 g. of product, M.P. 178–179° C. (resolidified partially and melted completely at 184–186° C.) which was identical to that obtained using procedure A.

EXAMPLE 7

*1,4 - dihydro - 4 - (2 - diethylaminoethyl) - 3 - methyl - 1-phenylpyrazolo[4,3-c] [1,2]benzothiazine 5,5-dioxide hydrochloride*

To a slurry of 3 g. of (0.066 mole NaH) a 53.4% mineral oil dispersion of sodium hydride in 300 ml. of dimethoxyethane is added a solution of 19 g. (0.061 mole) of 1,4-dihydro-3-methyl-1-phenylpyrazolo[4,3-c] [1,2]benzothiazine 5,5-dioxide in 300 ml. of dimethoxyethane and the reaction mixture is refluxed for one hour. A solution of 11 g. (0.066 mole) of 2-diethylaminoethyl bromide in 150 ml. dimethoxyethane is added and the mixture is refluxed for 18 hours. This is filtered and the filtrate is distilled in vacuo to yield an oily residue. The residue is dissolved in 1200 ml. of ether and ethereal hydrogen chloride is added until precipitation is no longer observed. The resulting crude hydrochloride is collected and is crystallized by trituration with 400 ml. of ethyl acetate. This material is recrystallized from methyl ethyl ketone to give 11.8 g. (3 crops) of 1,4-dihydro-4-(2-diethylaminoethyl) - 3 - methyl - 1-phenylpyrazolo[4,3-c] [1,2]benzothiazine 5,5-dioxide hydrochloride, M.P. 184–191° C. Recrystallization gives 6.8 g. of material, M.P. 189–191° C.; γ max. 3450, 2600, 2400, 1596 cm.$^{-1}$; λ max. mμ (ε) 273 (14,000), 297 sh. (10,400), λ min. 242 (5,100).

*Analysis.*—For $C_{22}H_{26}N_4O_2S \cdot HCl$—Calc'd: C, 59.11; H, 6.09; N, 12.53; S, 7.17; Cl, 7.93. Found: C, 58.87; H, 6.23; N, 12.31; S, 7.01; Cl, 7.95.

EXAMPLE 8

*4-acetonyl-1,4-dihydro-3-methyl-1-phenylpyrazolo [4,3-c] [1,2]benzothiazine 5,5-dioxide*

To a solution of 3.1 g. (0.01 mole) of 1,4-dihydro-3-methyl-1-phenylpyrazolo[4,3-c] [1,2]benzothiazine 5,5- dioxide in a mixture of 10 ml. of 1 N sodium hydroxide and 20 ml. of ethanol is added a solution of 2.0 g. of potassium iodide in 5 ml. of water. This solution is treated with 1.8 g. (0.02 mole) of chloroacetone and is allowed to stand at room temperature for 18 hours. On scratching and stirring there is obtained 3.2 g. of 4-acetonyl - 1,4 - dihydro-3-methyl-1-phenylpyrazolo[4,3-c] [1,2]benzothiazine 5,5-dioxide as crystals, M.P. 173–175° C. Recrystallization from ethanol gives materials, M.P. 174–175° C.; $\gamma$ max. 1736, 1598 cm.$^{-1}$; $\lambda$ max. m$\mu$ ($\epsilon$) 273 (14,500), 298 sh. (10,000), $\lambda$ min. 241 (5,400).

*Analysis.*—For $C_{19}H_{17}N_3O_3S$—Calc'd: C, 62.11; H, 4.66; N, 11.44. Found: C, 61.84; H, 4.66; N, 11.51.

EXAMPLE 9

*4-(2-hydroxypropyl)-1,4-dihydro-3-methyl-1-phenyl-pyrazolo[4,3-c] [1,2]benzothiazine 5,5-dioxide*

A mixture of 9.3 g. of 4-acetonyl-1,4-dihydro-3-methyl-1-phenylpyrazolo[4,3-c] [1,2]benzothiazine 5,5-dioxide, 3.8 g. of sodium borohydride and 400 ml. of isopropyl alcohol is stirred for 12 to 18 hours at room temperature. The solvent is evaporated and the residue is partitioned between water and dichloromethane. The dried dichloromethane solution is distilled in vacuo to dryness and the residue is triturated with 25 ml. of ethanol to give 8 g. of 4 - (2 - hydroxypropyl)-1,4-dihydro-3-methyl-1-phenyl-pyrazolo[4,3-c] [1,2]benzothiazine 5,5-dioxide as a crystalline product, M.P. 150–153° C. Recrystallization from ethanol gives 4.9 g. of material, M.P. 154–156° C.; $\gamma$ max. 3320, 1598 cm.$^{-1}$; $\lambda$ max. m$\mu$ ($\epsilon$) 273 (14,000), 300 sh. (10,000), $\lambda$ min. 242 (5,600).

*Analysis.*—For $C_{19}H_{18}N_3O_3S$—Calc'd: C, 61.94; H, 4.92; N, 11.40; S, 8.70. Found: C, 62.15; H, 5.11; N, 11.60; S, 8.51.

It is understood that the foregoing detailed description is given merely by way of illustration and that many variations may be made therein without departing from the spirit of our invention.

Having described our invention what we desire to secure by Letters Patent is:

1. A compound of the formula:

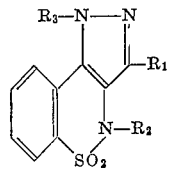

wherein $R_1$ is a member of the group consisting of lower alkyl and phenyl; $R_2$ is a member of the group consisting of hydrogen, lower alkyl, benzyl, cyanomethyl, carboxymethyl, carboalkoxymethyl, $$-CH_2COCH_3, -CH_2COC_6H_5$$

2-hydroxyalkyl and dialkylaminoalkyl; and $R_3$ is a member of the group consisting of hydrogen, lower alkyl and phenyl.

2. The compound of claim 1 which is 1,4-dihydro-3,4-dimethylpyrazolo[4,3-c] [1,2]benzothiazine 5,5-dioxide.

3. The compound of claim 1 which is 1,4-dihydro-3-methylpyrazolo[4,3-c] [1,2]benzothiazine 5,5-dioxide.

4. The compound of claim 1 which is 1,4-dihydro-4-methyl-3-phenylpyrazolo[4,3-c] [1,2]benzothiazine 5,5-dioxide.

5. The compound of claim 1 which is 1,4-dihydro-3-methyl-1-phenylpyrazolo[4,3-c] [1,2]benzothiazine 5,5-dioxide.

6. The compound of claim 1 which is 1,4-dihydro-4-(2 - diethylaminoethyl)-3-methyl-1-phenylpyrazolo[4,3-c] [1,2]benzothiazine 5,5-dioxide.

7. The compound of claim 1 which is 4-acetonyl-1,4-dihydro - 3 - methyl-1-phenylpyrazolo[4,3-c] [1,2]benzothiazine 5,5-dioxide.

8. The compound of claim 1 which is 4-(2-hydroxypropyl) - 1,4 - dihydro - 3 - methyl - 1 - phenylpyrazolo [4,3-c] [1,2]benzothiazine 5,5-dioxide.

9. A compound of the formula:

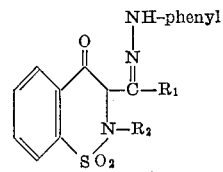

wherein $R_1$ is lower alkyl, $R_2$ is a member of the group consisting of hydrogen, lower alkyl, cyanomethyl, carboxymethyl, carboalkoxymethyl, $$-CH_2COCH_3, -CH_2COC_6H_5$$

2-hydroxyalkyl and dialkylaminoalkyl.

10. The compound of claim 1 which is 3-acetyl-4-hydroxy-2-methyl-2H-1,2-benzothiazine 1,1-dioxide phenylhydrazone.

References Cited

Abe et al., J. Pharm. Soc., Japan, vol. 76, pp. 1058–63 (1956).

WALTER A. MODANCE, *Primary Examiner.*

JOHN M. FORD, *Assistant Examiner.*